United States Patent
Nijim et al.

(10) Patent No.: US 9,990,115 B1
(45) Date of Patent: Jun. 5, 2018

(54) USER INTERFACE FOR PROVIDING ADDITIONAL CONTENT

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Anant Patil, Marietta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 307 days.

(21) Appl. No.: 14/303,570

(22) Filed: Jun. 12, 2014

(51) Int. Cl.
*G06F 3/048* (2013.01)
*G06F 3/0484* (2013.01)
*G06F 17/30* (2006.01)

(52) U.S. Cl.
CPC .... *G06F 3/04842* (2013.01); *G06F 17/30861* (2013.01)

(58) Field of Classification Search
None
See application file for complete search history.

(56) References Cited

U.S. PATENT DOCUMENTS

| | | | |
|---|---|---|---|
| 9,374,630 B1 * | 6/2016 | Nijim | H04N 21/8586 |
| 9,794,603 B1 * | 10/2017 | Nijim | H04N 21/2355 |
| 2002/0044683 A1 * | 4/2002 | Deshpande | H04N 5/272 |
| | | | 382/165 |
| 2002/0147984 A1 * | 10/2002 | Tomsen | H04N 5/4401 |
| | | | 725/109 |
| 2005/0223034 A1 * | 10/2005 | Kaneko | G06F 21/10 |
| 2008/0148336 A1 * | 6/2008 | Walter | H04N 21/235 |
| | | | 725/137 |
| 2008/0276278 A1 * | 11/2008 | Krieger | H04N 5/44543 |
| | | | 725/40 |
| 2009/0235150 A1 * | 9/2009 | Berry | G06F 17/30038 |
| | | | 715/205 |
| 2009/0259941 A1 * | 10/2009 | Kennedy, Jr. | G06F 17/3079 |
| | | | 715/719 |
| 2010/0077428 A1 * | 3/2010 | Arnold | H04N 7/17318 |
| | | | 725/34 |
| 2010/0154007 A1 * | 6/2010 | Touboul | G06Q 30/02 |
| | | | 725/60 |
| 2011/0138317 A1 * | 6/2011 | Kang | G06F 3/011 |
| | | | 715/780 |
| 2011/0154183 A1 * | 6/2011 | Burns | G06F 17/30899 |
| | | | 715/234 |
| 2012/0069131 A1 * | 3/2012 | Abelow | G06Q 10/067 |
| | | | 348/14.01 |
| 2013/0347018 A1 * | 12/2013 | Limp | H04N 21/4826 |
| | | | 725/19 |

* cited by examiner

*Primary Examiner* — Mahelet Shiberou
(74) *Attorney, Agent, or Firm* — Merchant & Gould

(57) ABSTRACT

User interface modules for providing additional interactive content via dynamic URL insertion within video applications may be provided. Available content items may be analyzed and prescreened to identify various user interface modules that may be used to provide indication of availability of additional interactive content. When a user selects to view a content item, the system may further perform a search to identify newer additional content associated with the requested content item and update the user interface modules, if necessary. The user interface modules may be presented to allow the user to access the associated additional content.

17 Claims, 9 Drawing Sheets

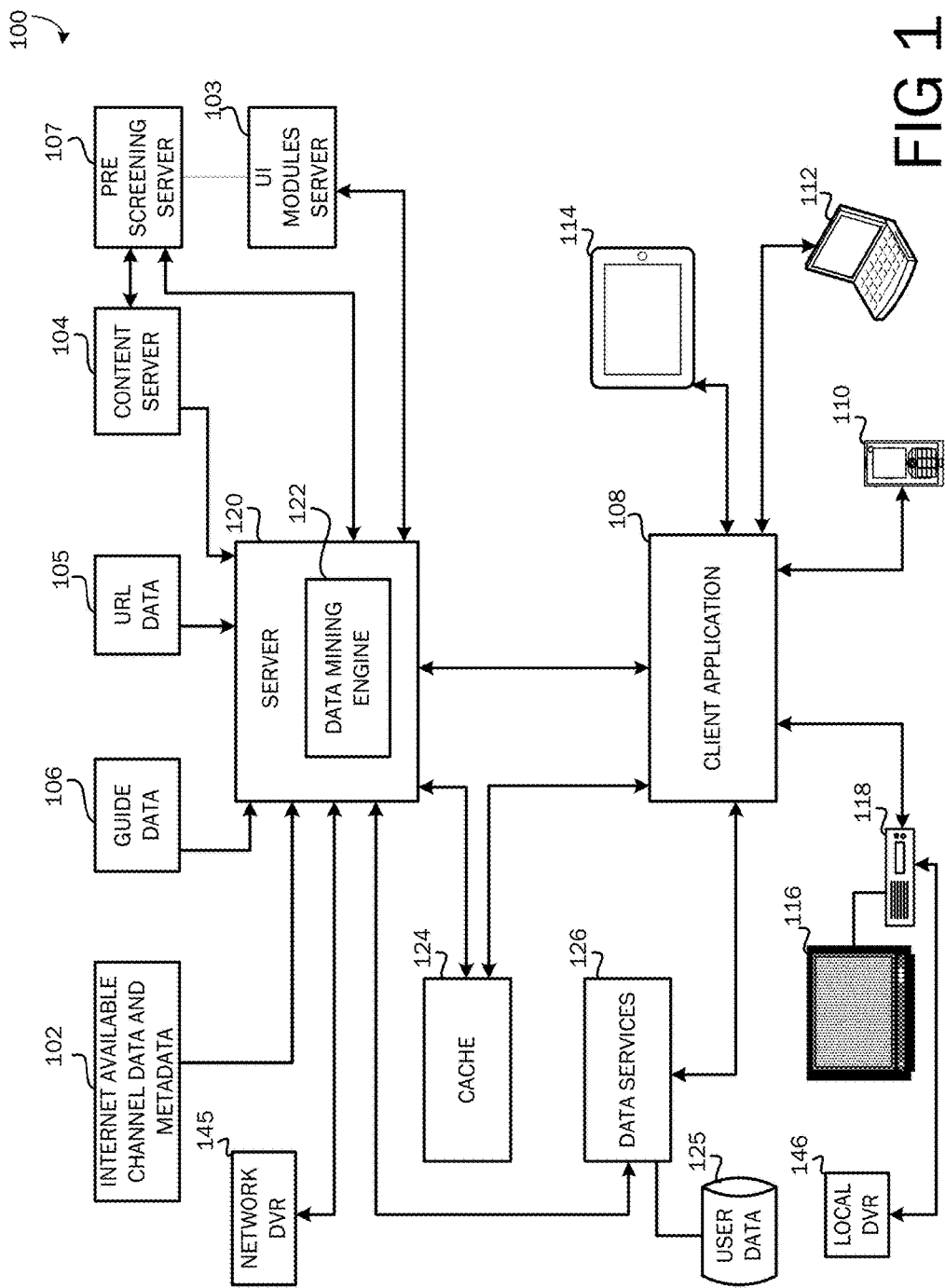

John Smith- Pedia
John Smith (born June 25, 1956) is an American chef, author, and television personality. He is known for his 2000 book Confidential in the Belly, and in 2005 he began hosting culinary and cultural adventure programs John Smith: Reservations. In 2013, he joined to host John Smith: Unknown.

Smith is a 1978 graduate of the Culinary Institute of America and a veteran of numerous professional kitchens.[1] Though Smith is no longer formally employed as a chef, he maintains a relationship with Brasserie in New York, where he was executive chef for many years. He is described as their "chef-at-large".[2]

Early life and family
John Smith was born in New York City, to Gladys Smith [3] and Pierre Smith (d. 1987).[4][5][6] His father was an executive for X Records in the classical music recording industry.[7][8] Smith's paternal grandparents were French: His paternal grandfather emigrated to New York following World War I, and his father grew up speaking French and spent many summers in France.[9] Smith's mother worked for Blue Times as a staff editor.[10]

He grew up in Leonia, New Jersey, and graduated from the New School in 1973.[12][13] He attended Fra College before dropping out after two years.[14] He graduated from the Institute of United in 1978.[15]

FIG 4

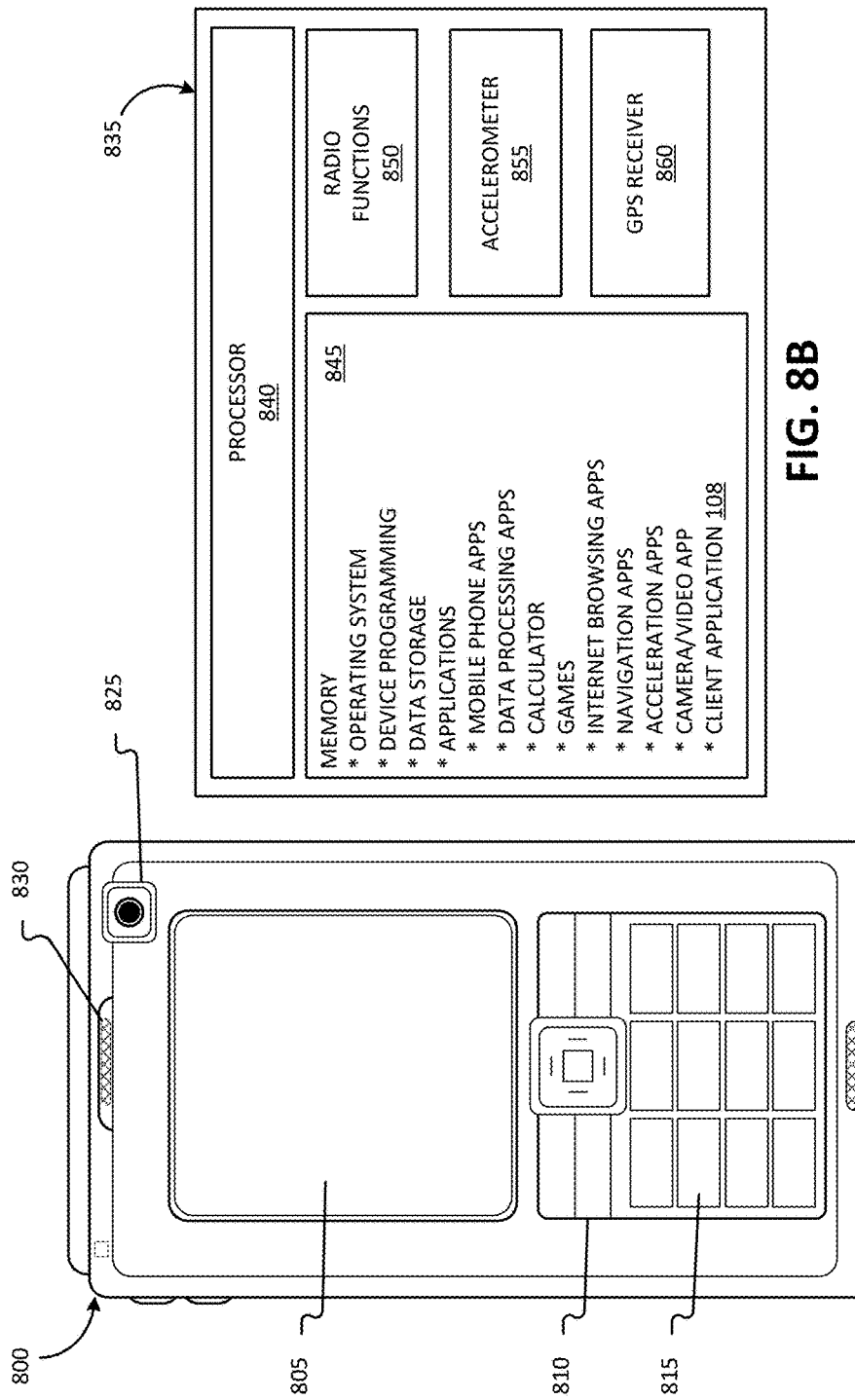

USER INTERFACE FOR PROVIDING ADDITIONAL CONTENT

BACKGROUND

Many consumers viewing a content item may desire to view additional content relating to the particular content item. For example, the consumer may want to view additional content relating to the subject matter of the content item, a particular actor/actress in the content item, or some other aspect of the content item. In such a situation, the consumer may utilize another device, such as a computer or mobile computing device, to navigate to a web page to perform a search for the additional content. Further, the consumer may then browse through the search results to find the additional content that is related to the "being viewed" content item and/or of interest to the consumer. This may be a tedious process.

While performing such steps, the consumer may have to either pause the "being viewed" content item or may be distracted from the content item and/or advertisements. With people dividing their attention between screens, the pressure may be increased for advertisers, content creators, content providers etc., to create compelling and/or engaging viewing experiences that span devices and content delivery systems.

SUMMARY

Embodiments of the present invention allow for seamless access to additional content. Embodiments may integrate one or more user interface modules within a user's video application to provide access to additional interactive content. Thus, the user may be provided with a convenient way to access additional information related to the "being viewed" content item. Once the user has finished accessing the additional interactive content, the user may be provided with an option to get back to full screen viewing of the "being viewed" content item.

Embodiments of the present invention provide a user interface (UI) module for providing dynamic uniform resource locators (URL) to additional interactive content within a video application. User interface modules and links may be updated in real time or at regular intervals based on various factors such as, time, location of the viewing device, user's viewing patterns, business rules/agreements, newer additional content available to the service provider, etc. Further, updating and/or inserting the URLs/links may be triggered by an action of the user or the service provider.

Embodiments of the present invention also allow for personalized additional interactive content relating to the content item that may be provided while the user is consuming the content item. The dynamic user interface modules may be based on metadata associated with the user. For example, a user interface module may provide personalized search results and additional interactive content based on a user profile, the user's viewing history, or business rules/agreements of the service provider.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF THE DRAWINGS

FIG. 1 is a block diagram of a system for providing creation of user interface modules for providing additional interactive content via dynamic URL insertion within video applications.

FIG. 4 is an illustration of rendering of additional content seamlessly from a viewing guide user interface or from a full screen video viewing mode.

FIGS. 8A and 8B illustrate a suitable mobile computing environment with which embodiments may be practiced.

DETAILED DESCRIPTION

Figure 2A:
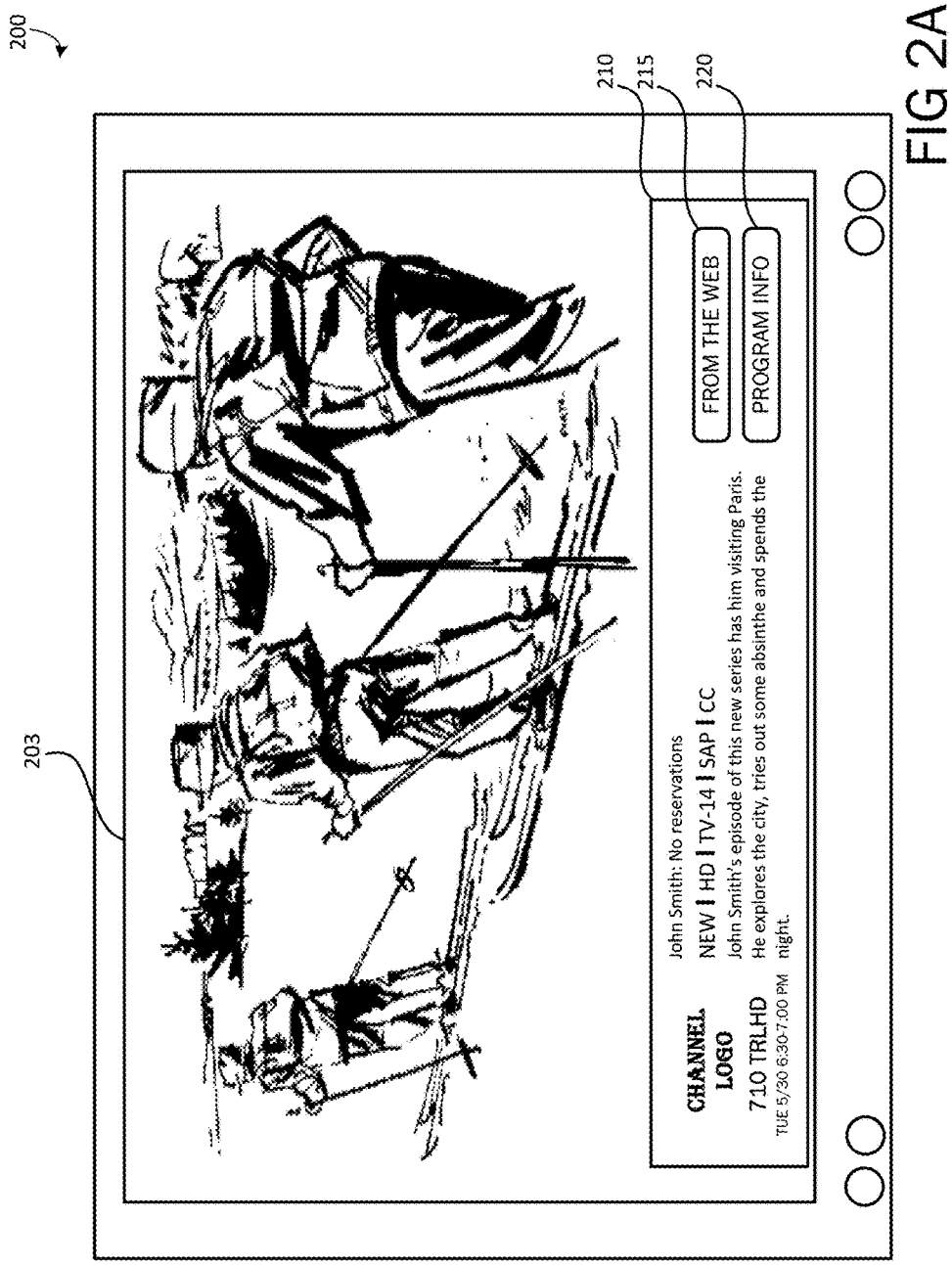
FIGS. 2A and 2B are illustrations of user interface modules for providing access to additional interactive content from a video viewing full screen mode.

As briefly described above, embodiments may provide a user interface module for providing seamless access to additional interactive content. The user interface module may be integrated within a video application to provide the user with simultaneous access to the additional interactive content. Available content items may be analyzed and pre-screened to identify a user interface module to provide additional interactive content. The system may also perform a search to identify new additional content associated with the content item being viewed. Once the user has finished accessing the additional interactive content, the user may be provided with an option to return to viewing the content item.

According to embodiments, content service providers may allow users/customers to access the URLs or links from channels, programs, or other related content to access web sites of the same or other content providers for additional content including adverting. Users/customers may access the web and watch/read/interact on the website. Users/customers may access a URL or link via one touch or other suitable interaction from a viewing experience, for example, from a viewing guide experience. Thus, the user/customer is provided seamless access to additional content followed by a return back to the previous viewing experience. Users/customers may switch from one link to another, without the need to return to the viewing guide, with one touch or other interaction or by tuning channels. If the user tunes to other channels while accessing a given link, the user may access the links associated with the tuned-to other channels without the need to return to the viewing guide.

According to embodiments, the links or URLs are inserted in the metadata of the content item, channel, or different URLs within the same content item. Each channel or content item that contains a link or URL may be displayed with a different icon for navigating to additional content, and the icon may be dynamically shown with different attributes or may be deleted based on the link information sent by the service provider. Different icon shapes, colors, attributes may be dynamically adjusted on the viewing guide based on the link and other information inserted with the URL or link.

These embodiments may be combined, other embodiments may be utilized, and structural changes may be made without departing from the spirit or scope of the present invention. Referring now to the drawings, in which like numerals refer to like elements throughout the several figures, embodiments of the present invention and an exemplary operating environment will be described.

FIG. 1 is a block diagram of a system 100 for providing creation of user interface modules for providing additional interactive content via dynamic URL insertion within video applications, as described above. Components of the system 100 may operate as a distributed system where each component is accessed via a suitable network, or the components may operate together as an integrated system. As illustrated, Internet-available channel data and metadata 102, content server 104, guide data 106 and URL data 105 may be provided. For example, Internet-available channel data and metadata 102 may include video content data and metadata available on the Internet, such as YouTube®, Hulu®, etc.

Content server 104 may include video content data and metadata provided by content owners/providers. The data and metadata may include information such as video content title, storyline, cast, genre, rating, release date, and images. Guide data 106 may include channel information, programming information, network information, etc.

Available content items may be analyzed and prescreened in the prescreening server 107 to identify various user interface modules that may be used to provide indication of availability of additional interactive content. These user interface modules may be stored in user interface (UI) modules server 103. For example, certain content providers/owners may have very strict business rules to present the video content items to the user. For example, the content providers/owners prefer for UI modules to be presented in a manner that doesn't distract the users from viewing the actual video content item. Thus, prescreening of the content items may thus play a vital role in such cases. For example, the prescreening server 107 may determine in advance which portion of the screen may be used to display the UI modules, such that the UI modules do not interfere with viewing the video content item. Thus providing the video content item and the UI modules in a way that may be acceptable by the content owners/providers, service providers and users. When content owners/providers restrictions are not present, a wider selection of UI modules may be presented.

URL data 105 may include additional interactive content or pointers to the additional interactive content associated with the content. Further, the user interface modules, links, or the additional interactive content may be updated. The update may be based on time, the availability of content, the availability of additional content, user behavior or another action by the user. For example, the update may be triggered at a specific point of time in the video content or at a periodic time throughout the day. In another example, the update may be triggered based on the manner in which the user consumes the video content and the additional content or video content being played. In yet another example, the update may be triggered base on an action by the user, such as when the user switches to a particular video content.

Local DVR 146 and Network DVR 145 may also be provided, which store DVR recordings locally or on a network for IP enabled devices 110,112,114. When a user records a video content item on the local DVR or the network DVR, the video content item may be recorded with the associated additional content. Applicable user interface modules may be recorded within the metadata as well. When the user decides to playback the recorded content item, the client application 108 may trigger the system to analyze the existing associated additional content and user interface modules and update them with new or more relevant additional content. Further, the user interface modules may also be updated to correspond to reflect the updated additional content.

According to an embodiment, the rendered experience may be presented according to a variety of display configurations. For example, in one embodiment, the "being viewed" video content is scaled to fit a smaller area inside the provided Internet-based content. In another embodiment, the transparency of the user interface modules is modified, thereby reducing interference with the "being viewed" video content. As noted above, certain content providers/owners may have very strict business rules, which may require the UI modules to be presented in a manner that does not distract the users from viewing the actual video content item.

The Internet-available channel data and metadata 102, content server 104, guide data 106, and URL data 105 may be provided to a server 120 where a data mining engine 122 may be operable to analyze and sort the data and metadata, associated URL data and metadata 105, and associate the channel data and metadata 102, with the guide data 106. The URL data 105 may be hidden or may be displayed to the user.

The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

According to another embodiment, new URLS or links may be inserted in real time based on the user's interactions with the additional content items on the user's viewing device and/or the user's secondary device. As can be appreciated, the URLs/links to additional content items may be updated/inserted along with the corresponding user interface modules based on various factors such as a user's profile, user's viewing history, user's social networks, time of the day, location of the viewing device, being viewed content, additional content available, business rules and agreements, and the like.

As illustrated in FIG. 1, various endpoint devices may be utilized to access video content that can leverage HTML or web technologies to display video content with additional interactive content. Embodiments of the present invention may be applied to any video decoding display device that can run an associated Internet browser as part of the user interface application layer. For example, endpoint devices may include, but are not limited to, a mobile communication device 110, such as a mobile phone, a computing device 112, such as a laptop computer, a wireless computing device, such as a tablet computing device 114, a television 116, such as an Internet-connected television or a television connected to a set top box (STB) 118. The endpoint device 110,112, 114,116 may be utilized to access a client application 108.

The client application 108 may be operable to receive a request from a user for accessing a video content item that may or may not have associated additional content. A search for additional interactive content may be performed and the results may be sorted based on specified criteria, e.g., a business rule. According to an embodiment, the search may or may not be a global search. It may be based on the user and/or the service provider.

Additional content may then be identified and associated with the video content item based on various factors. Further, one or more UI module(s) may also be identified based on the additional content that is to be presented to the user. The additional content may then be displayed and rendered via the one or more UI module(s) on a TV screen (or other display devices) in conjunction with the video content. As can be appreciated, while providing the video content item and the related additional content to the user, the system may continually perform a search for newer personalized additional content that may be presented.

As illustrated and described below, the client application 108 may provide an indication that additional interactive content is available. In one embodiment, the indication is presented via user interface modules on the screen in conjunction with the video content. In another embodiment, the indication is presented via user interface modules in a guide display. There may also be a designated button or other selectable controls available on a remote control or other suitable selection device. For example, a secondary screen companion device (e.g., a tablet) with an associated content provision application may also be used to receive the request of the interactive experience from the user. Other suitable means for interacting with the client application 108 includes touch command, voice command, gesture command, eye-tracking command, and combinations of various functionality interface methods and systems.

Once the user requests to access the additional interactive content, the device provides the user with interactive additional information. In one embodiment, the video content being played may be overlaid or replaced by the additional interactive content. For example, in one embodiment, the UI module is presented with website links (e.g., URLs) that create a web browser-type experience, as illustrated in FIG. 4, that provides the user with deeper and richer additional interactive content. The additional interactive content may comprise updated information feeds from a social media website, targeted advertisements, news items, videos and other additional content.

FIG. 2A is an illustration of one embodiment of a user interface module 210 for providing access to additional interactive content from a full screen video mode interface 200. As the full screen video 203 is being played on the user's viewing device, the user interface module 210 may be provided to indicate the availability of additional content. The indication may be in the form of a selectable button 215 that may provide search results relating to the additional content from the Internet. There may also be a selectable button 220 for providing access to additional program information from the service provider.

Figure 2B:
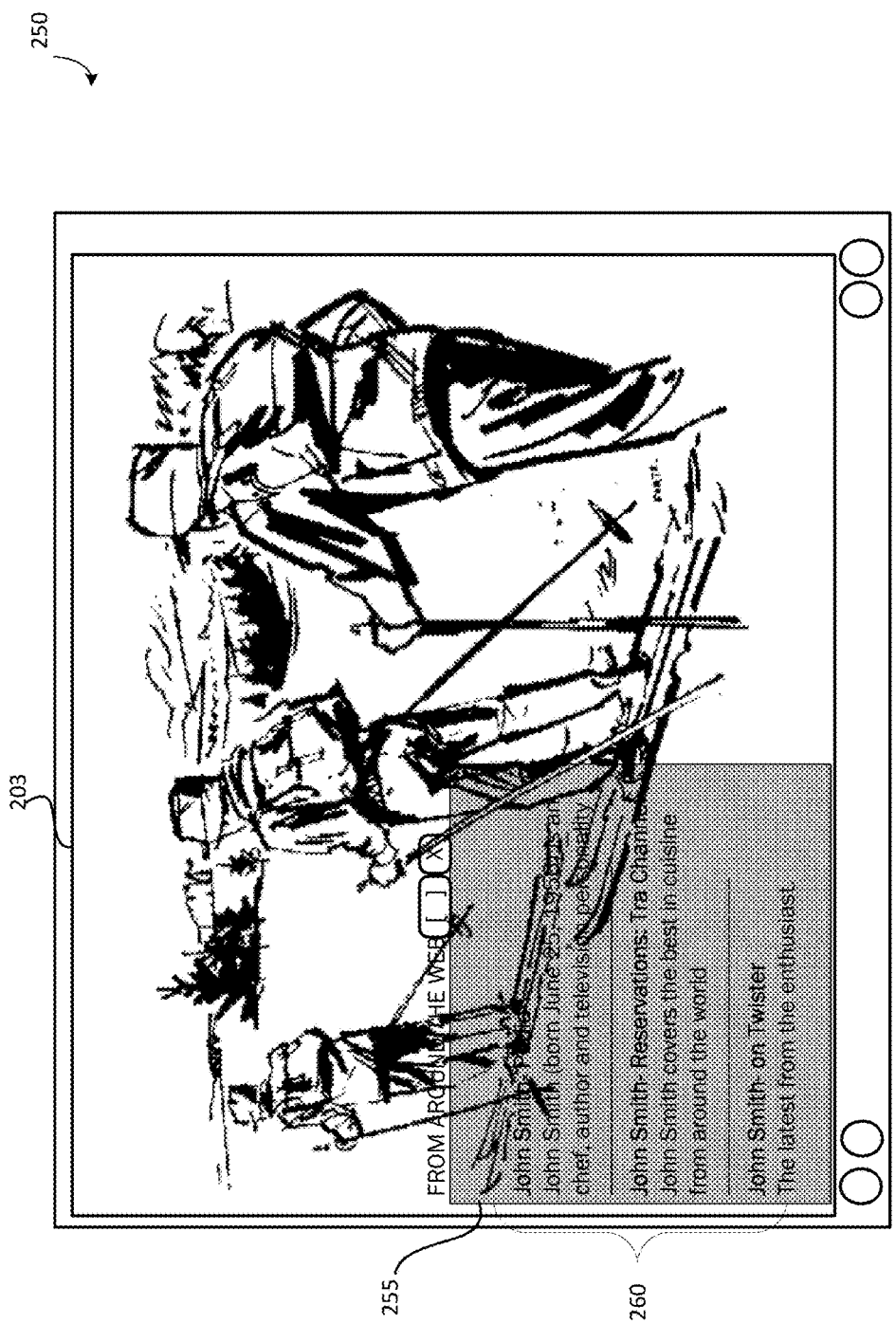

FIG. 2B is an illustration of one embodiment of a user interface module 250 for displaying selected additional interactive content while viewing video content in full screen mode. The user interface 250 may include the full screen video 203 with an overlaid user interface module 255 containing the personalized search results 260 of the additional content available. In the illustrated embodiment, the transparency of the user interface module 250 is modified, thereby reducing interference with the "being viewed" video content. The user interface module 250 may be presented in a variety of formats, such as with various different text formats, colors, highlighting, transparencies, and shapes.

Figure 3:
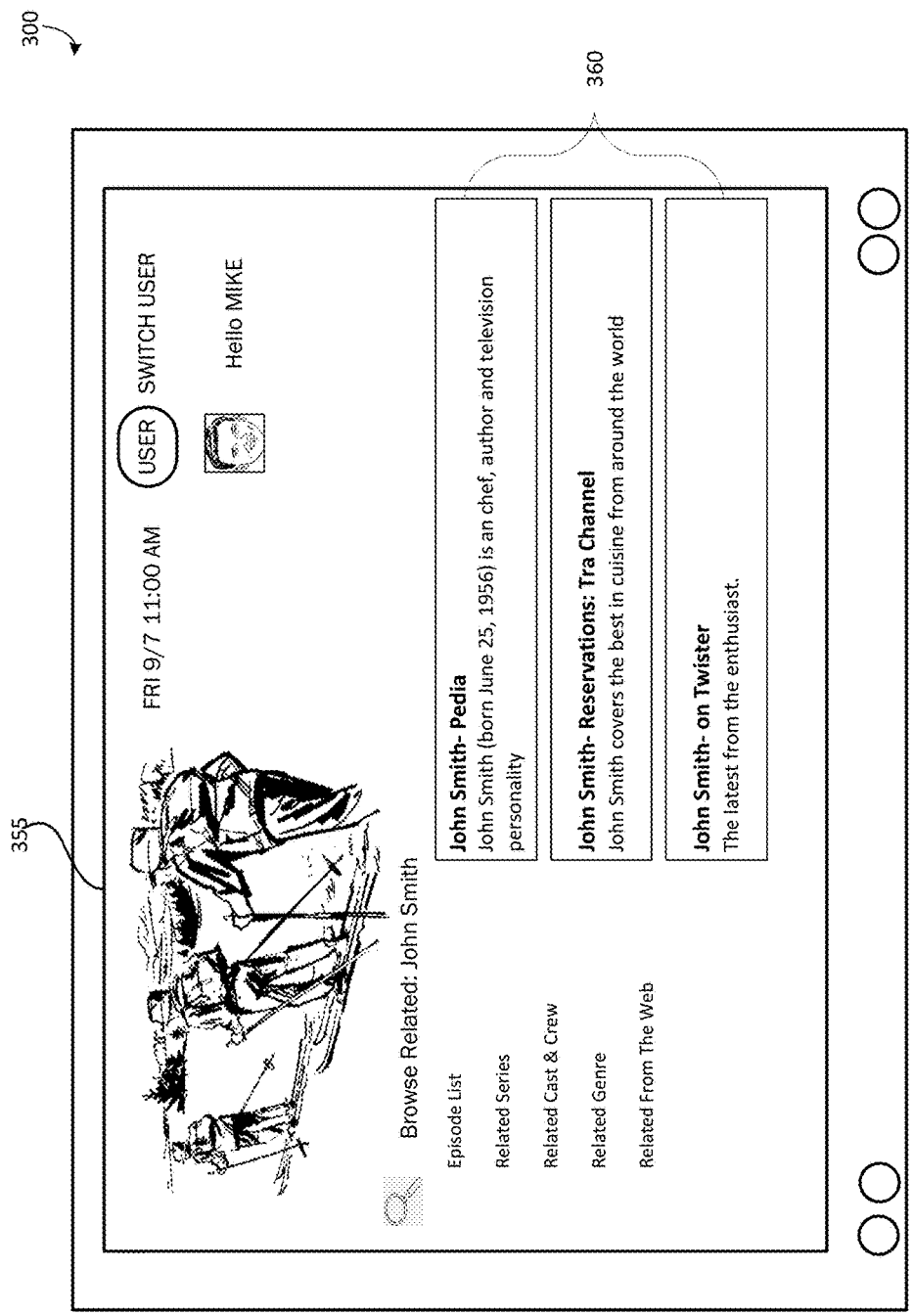
FIG. 3 is an illustration of a user interface module for providing access to and displaying additional interactive content from the guide user interface.

FIG. 3 is an illustration of the UI module being presented in a viewing guide user interface 300. The viewing guide user interface 300 may contain various content items available for the user. The content items may include an indication, e.g., icon, to identify additional content. According to an embodiment, the icon may be dynamically presented with various attributes to indicate updated additional content associated with the video content item.

According to one embodiment, the UI module 355 includes one or more icons in a list 360 of search items that provide links to additional content. The selection of one of the search results 360 from the UI module 355 may request the additional interactive content associated with the URL associated with the video content item.

As should be appreciated, the icons illustrated in FIG. 3 are only examples of selectable functionality controls that may be used to request information associated with a given URL. For example, a selectable control for requesting the additional interactive content available may be provided in a menu of options. In another example, a selectable functionality control may be provided as a designated button or key on a remote control device or on a keyboard associated with the viewing device (e.g., TV 116). In addition, an indication icon may be used to alert a user of the availability of additional interactive content that may be requested via other means such as voice or gesture activation.

According to an embodiment, the associated URL may be automatically updated based on time of day, user behavior, and available content or may be based on action from a user, service provider, content creator, content provider, third party content provider, or the like. Further, the update may also be based on business agreements in order to display the additional content associated with a particular scene in the content item.

Further, embodiments may allow the user to access the additional content based on how the user would like to view the additional content. For example, a user may be able watch the additional content in a video pane while the user may choose to hear the audio portion of the "being viewed" video content or the user may choose to hear the audio portion of the additional content by selecting the video pane.

The user interface modules illustrated in FIGS. 2A, 2B, 3 are for purposes of example only and are not exhaustive of the visual indicators that may be displayed to provide the users with the options to access the available additional interactive content.

Once the user selects a given search result 260, 360 from a user interface module, as illustrated and described above, the user may be provided with additional content seamlessly from a viewing guide user interface or a full screen video viewing mode 400, such as illustrated in FIG. 4. For example, if the user selects a search result, a web page 403 with additional content may be presented. In some embodiments, the web page 403 may include functionalities that are associated with web page navigation. In other embodiments, additional video content or additional audio content may be presented to the user via the web page 403 or other UI module.

Once the user is finished accessing the additional interactive content, the user may switch back to viewing the original "being viewed" content item. This may allow the user to have seamless access to personalized additional content and may provide the user with the option to return back to the previous viewing experience effortlessly.

As can be appreciated, according to an embodiment, in the case of nonlinear content, when the user switches back to the original "being viewed" content item, the system 100 may be able to continue from the viewing location at which the user switch to the additional interactive content item. In another embodiment, in case of a linear content item, the user may be taken to the current point that may be streaming at that point of time.

As briefly described above, embodiments may provide a user interface module to provide seamless access to additional interactive content. The user interface module may be integrated within a video application to provide the user with simultaneous access to the additional interactive content. Available content items may be analyzed and prescreened to identify a user interface module to provide additional interactive content. The system 100 may also perform a search to identify new additional content associated with the content item being viewed. Once the user has finished accessing the additional interactive content, the user may be provided with an option to return to viewing of the content item.

Figure 5:
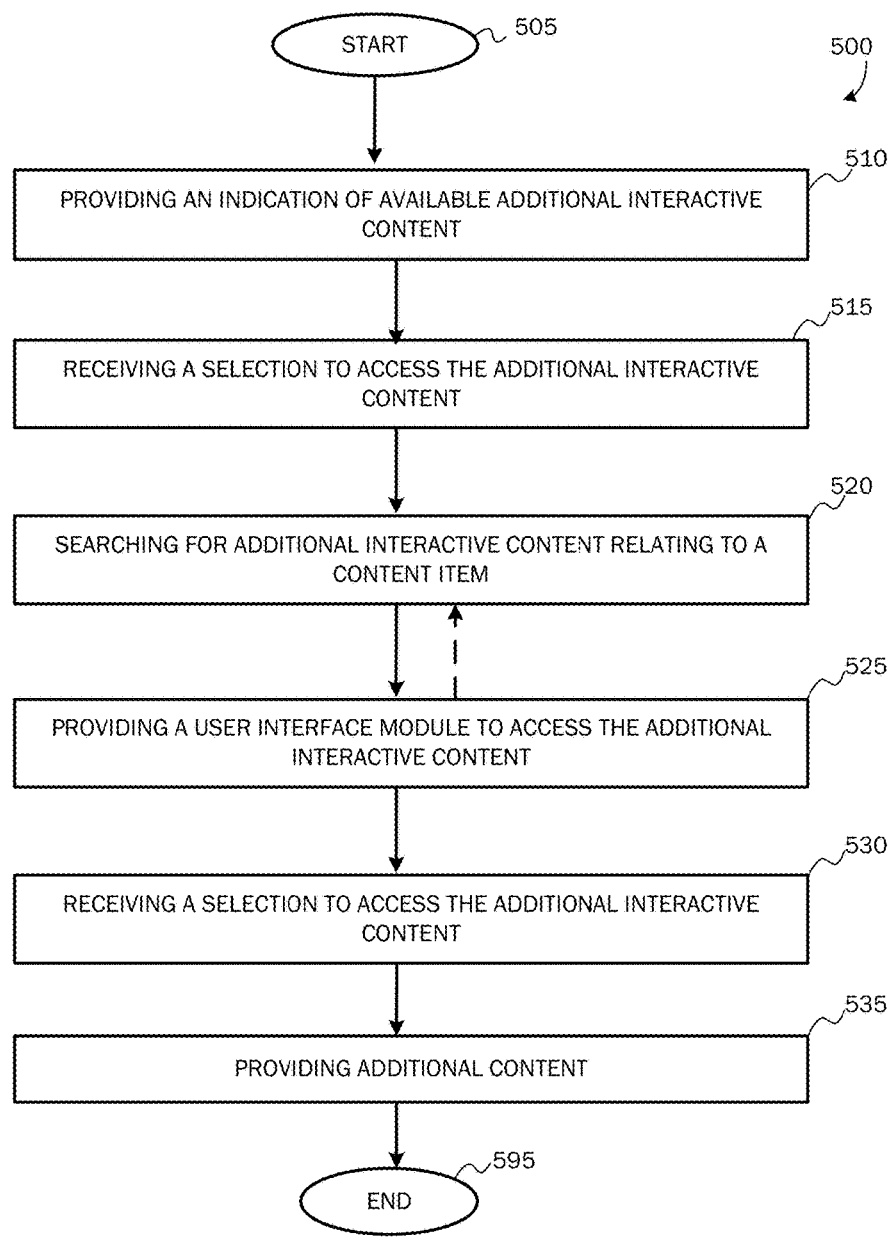
FIG. 5 is a flow chart of a method for providing creation of user interface modules for providing additional interactive content via dynamic URL insertion within video applications.

FIG. 5 is a flow chart of a method 500 for providing a user interface module to provide access to additional interactive content. The method 500 starts at OPERATION 505 and proceeds to OPERATION 510 where the video content item may be provided to the user along with an indication of availability of additional interactive content. According to an embodiment, the indication may be provided via user interface modules on the viewing guide user interface before the user decides to access a particular content item. For example, related information on a particular show may be provided by presenting an icon that indicates the availability of additional interactive content.

The method 500 proceeds to OPERATION 515 where the user may select to view the additional content. The selection may be performed via selecting the UI module on the viewing guide user interface as illustrated in FIG. 3 or via selecting the UI module, presented during the video content item full screen viewing mode. The method 500 may then trigger the system 100 to perform a search for additional content at OPERATION 520. The search may be performed in real time or at regular intervals based on business rules and agreements. According to an embodiment, a search for additional content may be performed based on various keywords within the metadata of the video content item. Relevant metadata may be automatically inserted into the web search engine. For example, keywords such as the name of the cast may be used to perform the search.

According to embodiments, a search may be performed in a manner for personalization for the user. For example, the search results containing additional content may vary from one user to another for the same video content item. That is, it may be targeted additional content. Also, search results may be filtered based on business rules such that the additional content that is provided to the user may be based on what the system 100 identifies as interesting for the user based on an established user profile, e.g., viewing habits, which enables a personalized viewing experience. According to an embodiment, the search results of the additional content presented via the UI module may include URLs with web content, link to other video content items.

The method 500 proceeds to OPERATION 525 where an applicable UI interface module with the search results may be dynamically presented to the user for receiving a selection of additional interactive content. The UI module may be presented in a variety of formats, such as with various different text formats, colors, highlighting, transparencies, shapes etc. For example, according to an embodiment, if the additional content related to a video content item is a generic web page URL of the content provider, then the UI may be in a yellow color, or may have high transparency etc., whereas if the system analysis results in additional content that may be identified as urgent then the UI modules presented to the user's viewing device may be red in color or with less transparency. Further, in the same example, the UI modules may dynamically updated as new additional content is identified.

The user may then choose to access additional content from the list of search results provided via the UI module at OPERATION 530. The additional content may then be presented to the user at OPERATION 535 as a web page or along with the video content item in a hybrid fashion. According to an embodiment, the user may be able to consume the additional content in a variety of different formats. Such formats include but are not limited to a full web experience, a video player within the web site, or a video player overlaid on the website. The user may also be provided with the option of expanding the additional content to full screen.

According to yet another embodiment, if the user has a secondary device, the system may be able to detect the secondary device and present the corresponding UI modules to provide the additional content to the secondary device for viewing.

As the user may be accessing the additional content with the video content item, the method 500 may continually search for additional content relating to the being viewed content item at OPERATION 520. As new related additional content may become available, the UI modules may dynamically update and be presented to the user.

According to embodiments, once the user no longer wishes to view the additional interactive content, the user may go back to the screen from where they initiated the access to the additional content. In one embodiment, after viewing the additional interactive content the user is returned to full screen viewing of the video content item. In another embodiment, after viewing the additional interactive content the user is returned to the viewing guide user interface. According to yet another embodiment, when the user tunes to a different content item while accessing the additional content, the user may be provided with a new UI module that includes additional content associated with the new content item.

The method 500 ends at OPERATION 595.

Figure 6:
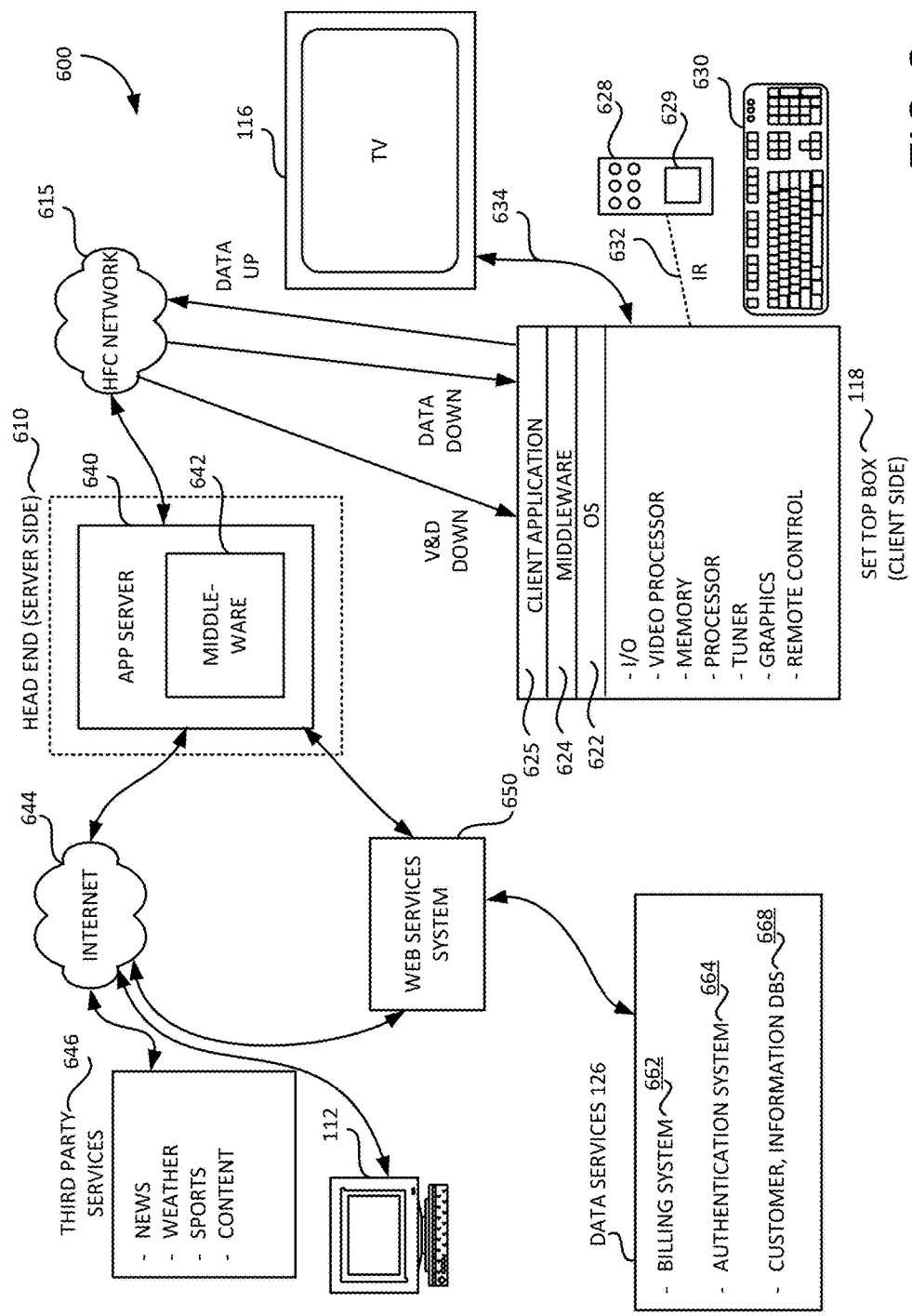
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing editing and changing of links of programs in real time. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the client application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 664 may include information such as secure user names, subscriber profiles, subscriber IDs, and passwords utilized by customers for access to network services. As should be understood by those skilled in the art, the disparate systems 650, 662, 664, 668 may be integrated or provided in any combination of separate systems, wherein FIG. 6 shows only one example.

Figure 7:
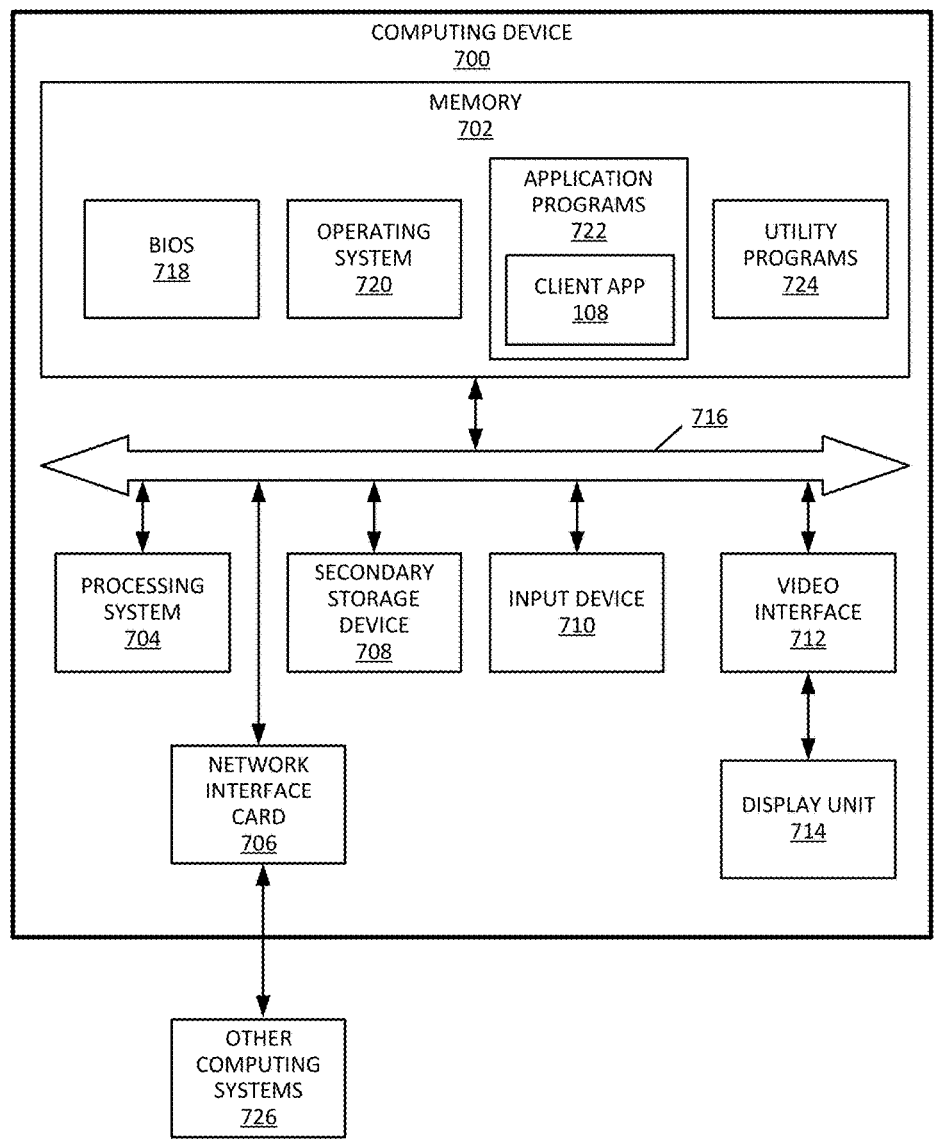
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components 108, 110, 112, 114, 116, 118, 120, 122, 124, 126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client application 108 may be stored locally on computing device 700. Memory 702 thus may store the computer-executable instructions that, when executed by processor 704, cause the client application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

FIGS. 8A-B illustrate a suitable mobile computing environment, for example, a mobile computing device 800, a smart phone 110, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
providing an indication of additional content while displaying a video content item that includes metadata:
receiving a selection to view the additional content;
searching for the additional content relating to the video content item;
providing a user interface module including links to the additional content while displaying the video content item;
modifying a display of the user interface module to reduce interference with display of the video content item;
receiving a selection to access the additional content;
providing the additional content on a viewing device;
inserting, in real time, a new link in the metadata of the video content item according to interactions with the additional content on the viewing device:
automatically updating one or more of the links when new additional content is associated with the video content item;
dynamically updating the user interface module with one or more updated links associated with the new additional content while displaying the video content item,
continually searching for the new additional content relating to the video content item; and
updating the links in the user interface module to include the new additional content relating to the video content item according to the continually searching.

2. The method of claim 1, wherein the user interface module comprises:
a first user interface module to display a selectable control configured to provide personalized search results relating to the additional content; and
a second user interface module to display the personalized search results of the additional content after actuation of the selectable control.

3. The method of claim 1, wherein the user interface module comprises search results for the additional content.

4. The method of claim 3, wherein the search results for the additional content are sorted based on business rules of a service provider.

5. The method of claim 1, wherein receiving the selection to access the additional content comprises receiving the selection via:
the user interface module;
button on a remote control;
voice input;
gesture input; or
eye tracking input.

6. The method of claim 1, wherein searching for additional content relating to the video content item may be performed in real time, at regular intervals, or in response to user trigger.

7. The method of claim 1, wherein identifying the additional content may be performed based on one or more of:
user's profile;
user's viewing history;
user's social networks;
time of day;
location of the viewing device;
being viewed content;
additional content available; or
business rules and agreements.

8. The method of claim 1, wherein providing the indication of the additional content comprises providing the indication on a full screen linear video display via a menu option, icon display, or an indicative icon overlaid in a viewing guide interface.

9. The method of claim 1, further comprising:
updating the additional content in response to receiving an indication of a change in the video content item or an indication of updated additional content associated with the video content item; and
updating the user interface module.

10. A system comprising:
a memory storage; and
a processing unit coupled to the memory storage, wherein the processing unit is operable to:
provide an indication of additional interactive content while displaying a video content item that includes metadata:
receive a selection to view the additional interactive content;
search for the additional interactive content relating to the video content item;
provide a user interface module including links to the additional interactive content while displaying the video content item;
modify a display of the user interface module to reduce interference with display of the video content item;
receive a selection to access the additional interactive content;
provide the additional interactive content on a viewing device;
insert, in real time, a new link in the metadata of the video content item according to interactions with the additional interactive content on the viewing device;
automatically update one or more of the links when new additional content is associated with the video content item;
dynamically update the user interface module with one or more updated links associated with the new additional content while displaying the video content item;
continually search for the new additional interactive content relating to the video content item; and
update the links in the user interface module for allowing access to the new additional interactive content relating to the video content item according to the continual search.

11. The system of claim 10, wherein providing the indication of the additional interactive content comprises providing the indication in a viewing guide user interface.

12. The system of claim 10, wherein the user interface module comprises search results for the additional interactive content.

13. The system of claim 12, wherein the search results for the additional interactive content are sorted based on business rules of a service provider.

14. A non-transitory computer readable storage medium containing computer executable instructions which when executed by a computer perform a method comprising:
providing an indication of additional interactive content while displaying a being-viewed video content item that includes metadata;
receiving a selection to view the additional interactive content;
searching for the additional interactive content associated with the being-viewed video content item;
providing a user interface module including links to the additional interactive content while displaying the being-viewed video content item;
modifying a display of the user interface module to reduce interference with display of the being-viewed video content item;
receiving a selection to access the additional interactive content;
providing the additional interactive content on a viewing device;
inserting, in real time, a new link in the metadata of the being-viewed video content item according to interactions with the additional interactive content on the viewing device;
automatically updating one or more of the links when new additional interactive content is associated with the being-viewed video content item;
dynamically updating the user interface module with one or more updated links associated with the new additional interactive content while displaying the being-viewed video content item;
continually searching for the new additional interactive content relating to the being-viewed video content item; and
updating the links in the user interface module to include the new additional interactive content relating to the being-viewed video content item according to the continually searching.

15. The computer readable storage medium of claim 14, wherein providing the indication of the additional interactive content comprises providing the indication in a viewing guide user interface.

16. The computer readable storage medium of claim 14, wherein the user interface module comprises search results for the additional interactive content.

17. The computer readable storage medium of claim 16, wherein the search results for the additional interactive content are sorted based on business rules of a service provider.

* * * * *